(12) United States Patent
Lu

(10) Patent No.: US 12,420,432 B2
(45) Date of Patent: Sep. 23, 2025

(54) ROBOT FEEDBACK METHOD AND ROBOT

(71) Applicant: Huawei Technologies Co., Ltd., Shenzhen (CN)

(72) Inventor: Zhantao Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 201 days.

(21) Appl. No.: 18/550,855

(22) PCT Filed: Mar. 11, 2022

(86) PCT No.: PCT/CN2022/080271
§ 371 (c)(1),
(2) Date: Sep. 15, 2023

(87) PCT Pub. No.: WO2022/194029
PCT Pub. Date: Sep. 22, 2022

(65) Prior Publication Data
US 2024/0181652 A1 Jun. 6, 2024

(30) Foreign Application Priority Data
Mar. 15, 2021 (CN) .......................... 202110278064.8

(51) Int. Cl.
*B25J 13/08* (2006.01)

(52) U.S. Cl.
CPC .................................. *B25J 13/084* (2013.01)

(58) Field of Classification Search
CPC ..... B25J 13/084; B25J 13/088; G05D 1/0253; G05D 1/0221; G05D 1/0223
See application file for complete search history.

(56) References Cited

U.S. PATENT DOCUMENTS

| | | | |
|---|---|---|---|
| 6,537,128 B1 * | 3/2003 | Hampton | A63H 3/48 446/298 |
| 6,980,956 B1 * | 12/2005 | Takagi | G06N 3/004 700/250 |
| 2002/0158599 A1 * | 10/2002 | Fujita | G10L 15/26 704/E15.045 |
| 2009/0055019 A1 * | 2/2009 | Stiehl | B25J 9/1671 901/17 |
| 2013/0178982 A1 * | 7/2013 | Wong | A63H 3/001 700/258 |
| 2022/0001547 A1 | 1/2022 | Shimoe et al. | |

FOREIGN PATENT DOCUMENTS

| | | |
|---|---|---|
| CN | 106914899 A | 7/2017 |
| CN | 108312155 A | 7/2018 |
| WO | 2020105309 A1 | 5/2020 |

\* cited by examiner

*Primary Examiner* — Dalena Tran
(74) *Attorney, Agent, or Firm* — Conley Rose, P.C.

(57) ABSTRACT

A robot feedback method includes that an IMU is mounted in the robot, a plurality of first preset regions are provided with a touch sensor, the touch sensor is configured to collect an operation acting on the robot, and the IMU is configured to collect a heading angle of the robot. The robot receives a first operation acting on a first region of the first preset regions. In addition, the robot obtains location information of the first region, an operation type of the first operation, and a first offset reflecting a force of the first operation acting on the robot. Then the robot executes a first control event corresponding to the location information of the first region, the operation type of the first operation, and the force of the first operation acting on the robot.

20 Claims, 9 Drawing Sheets

ROBOT FEEDBACK METHOD AND ROBOT

CROSS-REFERENCE TO RELATED APPLICATIONS

This application is a U.S. National Stage of International Patent Application No. PCT/CN2022/080271 filed on Mar. 11, 2022, which claims priority to Chinese Patent Application No. 202110278064.8 filed on Mar. 15, 2021. The disclosures of the aforementioned applications are hereby incorporated by reference in their entireties.

TECHNICAL FIELD

Embodiments of this application relate to the field of robot technologies, and in particular, to a robot feedback method and a robot.

BACKGROUND

With the development of science and technology, a degree of anthropomorphism of a smart robot is increasingly high. A user may send an instruction to the smart robot through a voice, an action (for example, a knock, continuous knock, or touch and hold), or the like, so that the smart robot executes a control event corresponding to the instruction. For example, the user may input an operation (for example, touch and hold) on any part (for example, a palm) of the smart robot. After receiving the touch and hold operation input by the user on the palm part, the smart robot may execute a handshake event with the user.

Currently, the smart robot can receive and recognize, through a touch sensor, the operation input by the user. For example, the smart robot may recognize, through the touch sensor, that the operation input by the user is a touch and hold operation. For another example, the smart robot may recognize, through touch sensor, that the operation input by the user is a knock operation.

However, there are a plurality of external factors that affect the anthropomorphism of the smart robot. With an increasingly high requirement on the degree of anthropomorphism of the smart robot, the smart robot cannot accurately make a corresponding feedback only by recognizing an operation type of an operation through the touch sensor.

SUMMARY

This application provides a robot feedback method. The robot can accurately execute a corresponding control event with reference to a plurality of external factors that affect anthropomorphism of the robot, to improve a degree of anthropomorphism of the robot.

According to a first aspect, this application provides a robot feedback method. The method may be applied to a robot, where an inertial measurement unit (Inertial Measurement Unit, IMU) is mounted in the robot, a plurality of first preset regions each on an inner side of a housing of the robot are provided with a touch sensor, the touch sensor is configured to collect an operation acting on the robot, and the IMU is configured to collect a heading angle of the robot.

In the method, the robot may receive a first operation acting on a first region, where the first region is any region of the plurality of first preset regions. In addition, the robot may obtain location information of the first region, an operation type of the first operation, and a first offset, where the first offset indicates an offset of the heading angle of the robot after the robot receives the first operation, and the first offset reflects a force of the first operation acting on the robot.

Generally, when a force of an operation acting on the robot is excessively large, the robot may vibrate (or shake). When the force of the operation acting on the robot is small, the robot does not vibrate. When the robot vibrates, the heading angle of the robot changes. Therefore, the force of the operation acting on the robot can be reflected based on an offset of the heading angle of the robot.

Then, in response to the first operation, the robot may execute a first control event corresponding to the location information of the first region, the operation type of the first operation, and the force of the first operation acting on the robot.

Based on the foregoing solution, after receiving the first operation acting on the robot, the robot may obtain the location information of the first region, the operation type of the first operation, and the offset (that is, the first offset) of the heading angle after the robot receives the first operation. The first offset may reflect the force of the first operation acting on the robot. In this way, the robot may execute a corresponding control event based on the location information of the first region, the operation type of the first operation, and the operation force of the first operation. Therefore, in this embodiment of this application, the robot can accurately execute a corresponding control event with reference to a plurality of external factors (a region of an operation, an operation type of the operation, and a force of the operation), to improve a degree of anthropomorphism of the robot.

For example, the first operation received by the robot is a knock operation, and the knock operation acts on a head region of the robot. In addition, a force of the knock operation is large, and the robot vibrates. In response to the knock operation, the robot may cover the head region with a hand and make a sound of "It hurts!".

With reference to the first aspect, in a possible design manner, the method further includes: The robot may obtain a first heading angle and a first initial heading angle, where the first heading angle is a heading angle of the robot after the robot receives the first operation, and the first initial heading angle is a heading angle of the robot before the robot receives the first operation. Then, the robot may calculate a difference between the first heading angle and the first initial heading angle to obtain the first offset.

For example, a heading angle (that is, the first initial heading angle) of the robot before the robot receives the first operation (for example, the knock operation) is A. After the robot receives the knock operation, a heading angle (that is, the first heading angle) of the robot is B. The first offset is B-A.

It should be noted that if the first offset is 0, it indicates that the first heading angle of the robot is the same as the first initial heading angle, that is, the heading angle of the robot does not change. Therefore, it may be determined that the robot does not vibrate, and the operation force of the operation is small. If the first offset is not 0, it indicates that the first heading angle of the robot is different from the first initial heading angle, that is, the heading angle of the robot changes. Therefore, it may be determined that the robot vibrates, and the operation force of the operation is large.

In this way, in the method provided in this application, the robot can execute the corresponding control event based on the operation force, to improve the degree of anthropomorphism of the robot.

With reference to the first aspect, in another possible design manner, the IMU is mounted on a head of the robot and/or a chest of the robot.

It should be noted that when the robot vibrates, a center of gravity of the robot definitely vibrates with the vibration of the robot. Therefore, a variation of a heading angle of the center of gravity of the robot is a variation of the heading angle of the robot. Generally, the center of gravity location of the robot is typically the head of the robot and/or the chest of the robot. Therefore, the IMU may be mounted on the head of the robot and/or the chest of the robot. In this way, when a force of an operation received by the robot is excessively large, the center of gravity (for example, the head and/or the chest) of the robot vibrates, and the IMU mounted on the head and/or the chest may obtain the variation of the heading angle of the center of gravity of the robot, that is, the variation of the heading angle of the robot.

With reference to the first aspect, in another possible design manner, if the first offset is greater than a preset offset threshold, the first operation is a strong operation; if the first offset is less than the preset offset threshold, the first operation is a soft operation, and a force corresponding to the strong operation is greater than a force corresponding to the soft operation.

For example, it is assumed that the preset offset threshold is 0. The robot is in a static state when not receiving the first operation, and the robot can collect an initial heading angle as a through the IMU. After the robot receives the first operation, the robot can collect the first heading angle as b through the IMU. If a is different from b (that is, the first initial heading angle is different from the first heading angle), the robot may determine that the first operation is the strong operation. If a is the same as b (that is, the first initial heading angle is equal to the first heading angle), the robot may determine that the first operation is the soft operation.

In this way, the robot can execute corresponding control events based on operations (the strong operation or the soft operation) of different forces, to improve the degree of anthropomorphism of the robot.

With reference to the first aspect, in another possible design manner, the plurality of first preset regions on the inner side of the housing of the robot are in a one-to-one correspondence with a plurality of second preset regions on a surface of the housing of the robot. The plurality of second preset regions are regions that are on the surface of the housing of the robot and in which a user operation frequency is greater than a preset frequency threshold.

That is, the region in which the touch sensor is disposed may be a region corresponding to a region that is on the surface of the housing of the robot and in which a user operation frequency is high. Therefore, the touch sensor is disposed only in the first preset region corresponding to the second preset region, so that a quantity of touch sensors disposed in the robot can be reduced. In this way, costs can be reduced while interaction experience between a user and the robot can be ensured.

With reference to the first aspect, in another possible design manner, the robot may further include a camera, and the camera is configured to capture an image. The method further includes: In response to the first operation, the robot may determine that the first control event is an artificially triggered control event if the robot collects portrait information. For example, in response to a pressing operation acting on an abdomen, the robot may determine that the touch event is a man-made strike event if the robot can collect the portrait information, and the first offset is greater than the preset offset threshold.

With reference to the first aspect, in another possible design manner, the portrait information includes: a face image and a portrait distance, where the portrait distance indicates a distance between the robot and a user. A method that "the robot may determine that the first control event is the artificially triggered control event if the robot collects the portrait information" includes: The robot may determine that the first control event is the artificially triggered control event if the robot collects the portrait information and the portrait distance is less than a preset distance threshold.

For example, it is assumed that the preset distance threshold is 1 m. The robot may collect a face image in response to the knock operation. If the portrait distance is 0.5 m, the robot may determine that the knock operation is a man-made knock operation.

Based on the foregoing technical solution, the robot can further determine, based on the distance between the robot and the user, that the first control event is the artificially triggered control event. In this way, accuracy of executing a corresponding control event by the robot can be further improved, and the degree of anthropomorphism of the robot can be improved.

With reference to the first aspect, in another possible design manner, the method further includes: The robot may determine that the first control event is a non-artificially triggered control event if the robot collects the portrait information and the portrait distance is greater than the preset distance threshold: or the robot determines that the first control event is a non-artificially triggered control event if the robot does not collect the portrait information.

For example, it is assumed that the preset distance threshold is 1 m. If the portrait distance is 3 m, the robot may determine that the knock operation is an accidental hit event. For example, the robot is smashed by an object (like a stone) or the robot collides with an object.

With reference to the first aspect, in another possible design manner, the method further includes: The robot receives, if beyond preset duration after the robot receives the first operation, a second operation acting on a second region, where the second region is any region of the plurality of first preset regions. Then, the robot may obtain location information of the second region, an operation type of the second operation, and a second offset, where the second offset is a difference between a second heading angle of the robot and a second initial heading angle of the robot, the second heading angle is a heading angle of the robot after the robot receives the second operation, the second initial heading angle is a heading angle of the robot before the robot receives the second operation, and the second offset reflects a force of the second operation acting on the robot. In response to the second operation, the robot may execute a second control event corresponding to the location information of the second region, the operation type of the second operation, and the force of the second operation acting on the robot.

It may be understood that, when an interval between the first operation and the second operation is greater than the preset duration, the robot may divide the first operation and the second operation into two touch events, and execute different control events. In this way, the robot can execute more control events, to improve the degree of anthropomorphism of the robot.

With reference to the first aspect, in another possible design manner, the method further includes: The robot may receive, if within the preset duration after the robot receives the first operation, the second operation acting on the second region. Then, the robot may obtain the location information of the second region, the operation type of the second operation, and the second offset. In response to the first operation and the second operation, the robot may execute a third control event corresponding to the location information of the first region, the operation type of the first operation, the force of the first operation acting on the robot, the location information of the second region, the operation type of the second operation, and the force of the second operation acting on the robot.

That is, in response to the first operation and the second operation, the robot may perform a control event (that is, the third control event). In this way, the robot can feed back a control event for a combination of a plurality of operations, to improve the degree of anthropomorphism of the robot.

With reference to the first aspect, in another possible design, the touch sensor includes a copper sheet.

It may be understood that a material of the copper sheet is soft, and the housing of the robot is curved. Therefore, the touch sensor can be well attached to the inner side of the housing of the robot. In this way, touch sensitivity of the robot can be increased, and a degree of anthropomorphism of the robot can be improved. In addition, costs can be further reduced.

According to a second aspect, this application provides a robot, where the robot includes: an inertial measurement unit IMU, a memory, and one or more processors. A plurality of first preset regions each on an inner side of a housing of the robot are provided with a touch sensor, and the IMU, the touch sensor, and the memory are coupled to the processor. The touch sensor is configured to collect an operation acting on the robot, and the IMU is configured to collect a heading angle of the robot. The memory is configured to store computer program code, where the computer program code includes computer instructions. When the computer instructions are executed by the processor, the robot is enabled to perform the method according to the first aspect and any possible design manner of the first aspect.

According to a third aspect, this application provides a chip system, and the chip system is used in a robot. The chip system includes one or more interface circuits and one or more processors. The interface circuit and the processor are connected to each other through a line. The interface circuit is configured to receive a signal from a memory of the robot, and send the signal to the processor, where the signal includes computer instructions stored in the memory. When the processor executes the computer instructions, the robot performs the method according to the first aspect and any possible design manner of the first aspect.

According to a fourth aspect, this application provides a computer storage medium. The computer storage medium includes computer instructions. When the computer instructions run on a robot, the robot is enabled to perform the method according to the first aspect and any possible design manner of the first aspect.

According to a fifth aspect, this application provides a computer program product. When the computer program product runs on a computer, the computer is enabled to perform the method according to the first aspect and any possible design manner of the first aspect.

It may be understood that for beneficial effects achievable by the robot according to the second aspect and any possible design manner of the second aspect, the chip system according to the third aspect, the computer storage medium according to the fourth aspect, and the computer program product according to the fifth aspect, refer to the beneficial effects according to the first aspect and any possible design manner of the first aspect. Details are not described herein again.

DESCRIPTION OF EMBODIMENTS

Figure 1A:
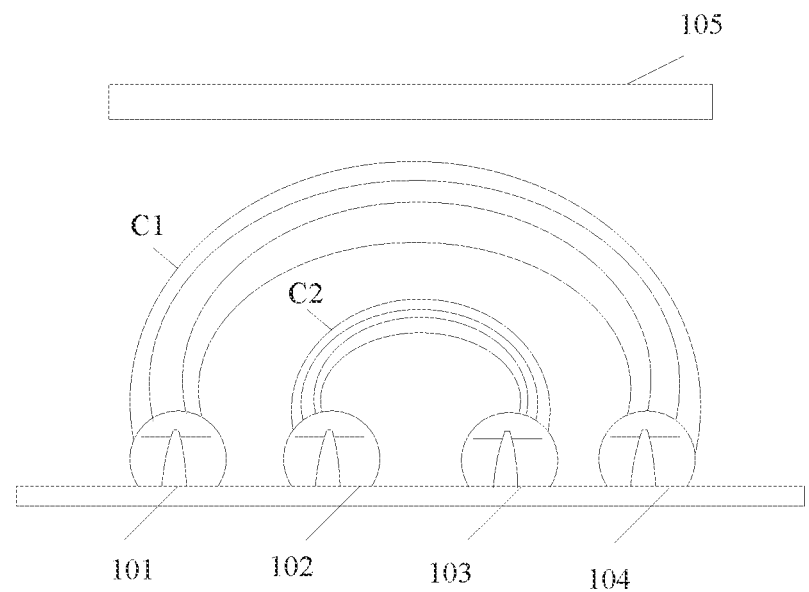
FIG. 1A is a schematic diagram of a structure of a touch sensor according to an embodiment of this application.

The following clearly and completely describes the technical solutions in embodiments of this application with reference to the accompanying drawings in embodiments of this application. It is clearly that the described embodiments are merely some but not all of embodiments of this application. All other embodiments obtained by a person of ordinary skill in the art based on embodiments of this application without creative efforts shall fall within the protection scope of this application.

The character "/" in this specification generally indicates an "or" relationship between the associated objects. For example, A/B may be understood as A or B.

The terms "first" and "second" are merely intended for a purpose of description, and shall not be understood as an indication or implication of relative importance or an implicit indication of a quantity of indicated technical features. Therefore, a feature limited by "first" or "second" may explicitly or implicitly indicate that one or more features are included. In the descriptions of embodiments, unless otherwise specified. "a plurality of" means two or more.

In addition, the terms "including", "having", or any other variant thereof in descriptions of this application are intended to cover a non-exclusive inclusion. For example, a process, a method, a system, a product, or a device that includes a series of steps or modules is not limited to the listed steps or modules, but optionally further includes another unlisted step or module, or optionally further includes another inherent step or module of the process, the method, the product, or the device.

In addition, in embodiments of this application, the terms such as "example" or "for example" are used to represent giving an example, an illustration, or a description. Any embodiment or design scheme described as "example" or "for example" in this application should not be explained as being more preferred or having more advantages than another embodiment or design scheme. Exactly, use of the term "example" or "for example" is intended to present a concept in a specific manner.

With the development of science and technology, robots have become increasingly popular in daily life. A plurality of sensors such as a visual sensor, an auditory sensor, and a tactile sensor may be mounted on the robot, to implement anthropomorphism of the robot. At present, anthropomorphism of the robot in aspects of visual and auditory has been mature. However, the tactile sensor cannot detect force information of an operation, which makes it difficult for the robot to meet a requirement of anthropomorphism in a tactile aspect. For example, when a user separately acts on a smart robot by using a same operation with different forces (for example, the user softly knocks the robot and the user strongly knocks the robot), the robot cannot obtain, through the tactile sensor, a force acting on the robot. Consequently, the robot cannot perform different control events for the soft knock and the strong knock.

In a current conventional technology, the robot may recognize a touch operation through a capacitive touch sensor 1. The capacitive touch sensor 1 is formed by connecting a plurality of sensor units in series. Each sensor unit includes four multi-function layers, and every two of the four multi-function layers are arranged opposite to each other. As shown in FIG. 1A, the sensor unit includes four multi-function layers, which are respectively a multi-function layer 101, a multi-function layer 102, a multi-function layer 103, and a multi-function layer 104. The multi-function layer 101 and the multi-function layer 104 form a capacitor C1, and the multi-function layer 102 and the multi-function layer 103 form a capacitor C2. For example, in FIG. 1A, a curve between the multi-function layer 101 and the multi-function layer 104 represents electric field distribution of the capacitor C1, and a curve between the multi-function layer 102 and the multi-function layer 103 represents electric field distribution of the capacitor C2. When an external object 105 enters electric field line distribution regions of C1 and C2, the sensor may obtain, based on a relationship between a variation and a variation time of C1 and C2, a speed and an acceleration when the external object 105 approaches the sensor unit. Then, the robot may determine, based on the speed and the acceleration when the external object 105 approaches the sensor unit, a force applied by the external object 105 to the robot. To be specific, it can be learned from the conventional technology that a larger speed and acceleration when the external object 105 approaches the sensor unit indicates a larger force applied by the external object 105 to the robot; and a smaller speed and acceleration when the external object 105 approaches the sensor unit indicates a smaller force applied by the external object 105 to the robot.

Figure 1B:
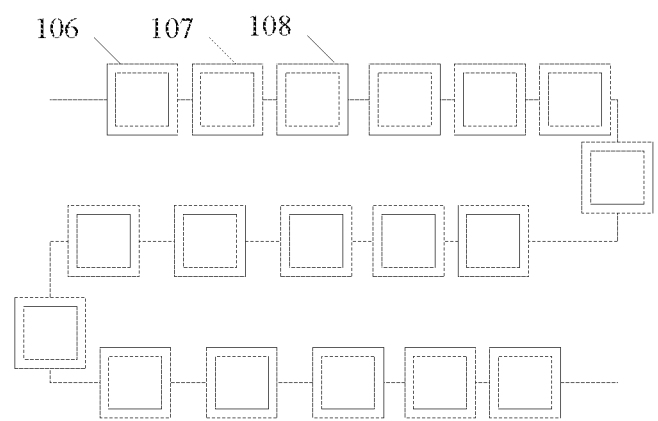
FIG. 1B is a schematic diagram of a structure of another touch sensor according to an embodiment of this application.

However, in the conventional technology, it is inaccurate to detect, by using a speed and an acceleration when an object approaches the sensor unit, a magnitude of a force applied by the external object to the robot. In addition, in the conventional technology, a plurality of capacitive touch sensors mounted in the robot are connected in series (for example, as shown in FIG. 1B, a capacitive touch sensor 106, a capacitive touch sensor 107, and a capacitive touch sensor 108 are connected in series), and cannot simultaneously perform feedback with reference to a plurality of operations.

Therefore, an embodiment of this application provides a robot feedback method. In the method, a robot may receive an operation of a user, and then execute a control event corresponding to the operation. A touch sensor and an IMU are disposed on an inner side of a housing of the robot. The touch sensor is configured to collect an operation acting on the robot, and the IMU is configured to collect a heading angle of the robot. Generally, when a force of an operation acting on the robot is excessively large, the robot may vibrate (or shake). When the force of the operation acting on the robot is small, the robot does not vibrate. When the robot vibrates, the heading angle of the robot changes. Therefore, the force of the operation acting on the robot can be reflected based on an offset of the heading angle of the robot.

In this embodiment of this application, the user may input operations of different operation types such as a knock operation, a continuous knock operation, and a touch and hold operation to the robot. The operations may act on different regions such as a head region, an abdomen region, and a hand region of the robot.

It may be understood that, after receiving the operation acting on the robot, the robot may obtain location information of a region on which the operation is performed, an operation type of the operation, and an offset of the heading angle of the robot when the robot receives the operation. In this way, the robot may execute, in response to the operation, a control event corresponding to the location information, the operation type of the operation, and the force of the operation. Therefore, in this embodiment of this application, the robot can accurately execute a corresponding control event with reference to a plurality of external factors (a region of an operation, an operation type of the operation, and a force of the operation), to improve a degree of anthropomorphism of the robot.

Figure 2A:
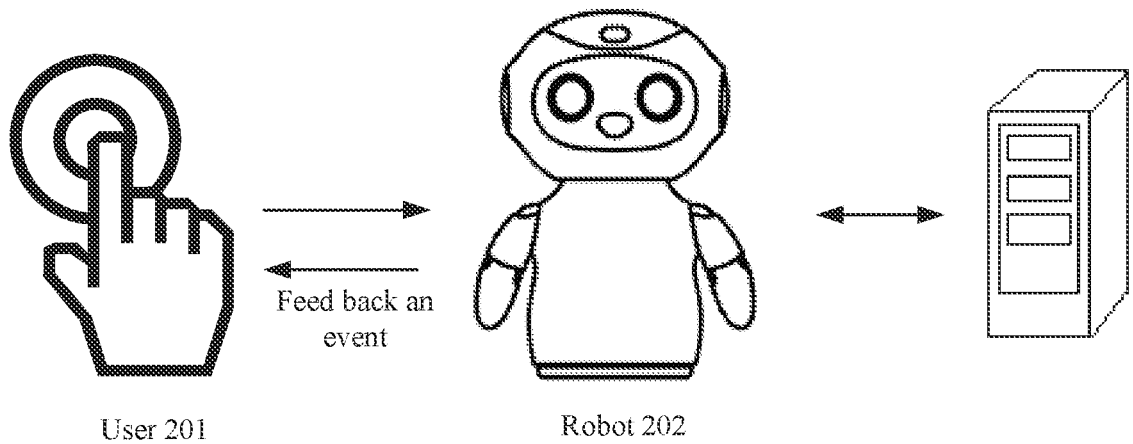
FIG. 2A is a schematic diagram of a composition of a system architecture to which a feedback method for a robot is applied according to an embodiment of this application.

FIG. 2A is a schematic diagram of a system architecture to which a method is applied according to an embodiment of this application. As shown in FIG. 2A, the system architecture includes: a user 201, a robot 202, and a server 203.

The user 201 may input an operation to the robot 202. The operation may be operations of different types input by the user 201 on the robot. For example, the operation may be a knock, touch and hold, continuous knock, or the like. For another example, the operation may alternatively be an operation input by the user 201 on the robot by using different forces. For example, the knock operation may be soft knock and strong knock.

It should be noted that the knock may be that the user 201 touches the robot through a finger or may be that the user 201 touches the robot through a palm (that is, slaps). This is not limited in this embodiment of this application.

The robot 202 may receive the operation acting on the robot 202. In addition, the robot 202 may recognize, based on a recognition policy, a touch event corresponding to the operation input by the user 201, and execute, based on a feedback policy, a control event corresponding to the touch event. The recognition policy reflects a correspondence between operation information generated by the operation received by the robot 202 and the touch event, and the feedback policy reflects a correspondence between the touch event and the control event.

For example, it is assumed that a touch event corresponding to operation information about pressing a hand of the robot 202 for 2 s in the feedback policy is a handshake event, and a control event that should be executed by the robot 202 and that corresponds to the handshake event in the feedback policy is a handshake event. The robot 202 receives the operation information that the user 201 presses the hand of the robot 202 for 2 s, and may recognize that the control event corresponding to the operation information is the handshake event, and execute the control event of handshaking with the user 201. The robot 202 may further record the operation information generated by the received operation and the touch event corresponding to the operation information. For example, the robot 202 receives operation information that the user 201 presses the hand of the robot 202 for 2 s, and a touch event corresponding to the operation information is a handshake event. For another example, the robot 202 receives operation information that the user 201 presses the hand of the robot 202 for 2.5 s, and a touch event corresponding to the operation information is also a handshake event.

In addition, the robot 202 may communicate with the server 203 in a wireless manner, to complete data exchange. The robot 202 may transmit historical data of the robot 202 to the server 203. The historical data of the robot 202 includes: location information of the robot 202, posture information of the robot 202, operation information generated when the robot 202 receives a user operation, and the like. The robot 202 may further receive an updated recognition policy and an updated feedback policy from the server 203.

The server 203 may provide a control policy (for example, the recognition policy and the feedback policy) for the robot 202, and the like. Specifically, the server 203 may send the recognition policy and the feedback policy to the robot 202. In addition, the server 203 may receive the historical data from the robot 202. For example, the server 203 may receive the operation information recorded by the robot 202 and the touch event corresponding to the operation information. In addition, the server 203 may update the recognition policy and the feedback policy based on the historical data, and send the updated recognition policy and the updated feedback policy to the robot 202. For example, before the robot 202 receives the updated feedback policy from the server 203, the robot 202 may execute a handshake event in response to an operation of touching and holding the hand for 2 s by the user. After the robot 202 receives the changed data from the server 203, the robot 202 may execute a handshake event in response to an operation of touching and holding the hand for 1 s by the user.

It should be noted that a type of the robot and a use of the robot are not particularly limited in this embodiment of this application. For example, the robot in this embodiment of this application may be an industrial robot, an agricultural robot, a home robot, a medical robot, a service robot, a space robot, an underwater robot, a military robot, a disaster relief robot, an education and teaching robot, and an entertainment robot.

The robot feedback method provided in this application may be executed by a robot feedback apparatus, and the execution apparatus may be a robot (for example, the robot 202). In addition, the execution apparatus may alternatively be a central processing unit (Central Processing Unit, CPU) of the robot, or a control module that is in the robot and that is configured to control the robot. In this embodiment of this application, an example in which the robot executes the robot feedback method is used to describe the robot feedback method provided in this embodiment of this application.

The following describes a hardware structure of a robot in embodiments of this application. Input components such as a touch sensor, an IMU, a camera, a receiver, a microphone, and output components such as a display, a speaker, and a steering gear limb are mounted on the robot. Optionally, only one or more of the input components or the output components may be mounted on the robot. In addition, the robot further bas a processor, an interface, an artificial intelligence (Artificial Intelligence, AI) capability, and the like.

The touch sensor is configured to collect an operation acting on the robot. For example, the touch sensor may collect an operation type (for example, a knock, continuous knock, touch and hold) of the operation received by the robot. The touch sensor may further collect location information (for example, a head, a hand, and a chest of the robot) of a region in which a user operates the robot. Optionally, the touch sensor is disposed at a preset location of a body of the robot, and may learn, by using preset location information, the region in which the user operates the robot. In this embodiment of this application, the robot includes a plurality of touch sensors. Optionally, each touch sensor is disposed on an inner side of a housing of the robot. Optionally, the plurality of touch sensors are disposed in parallel on the inner side of the housing of the robot.

Figure 2B:
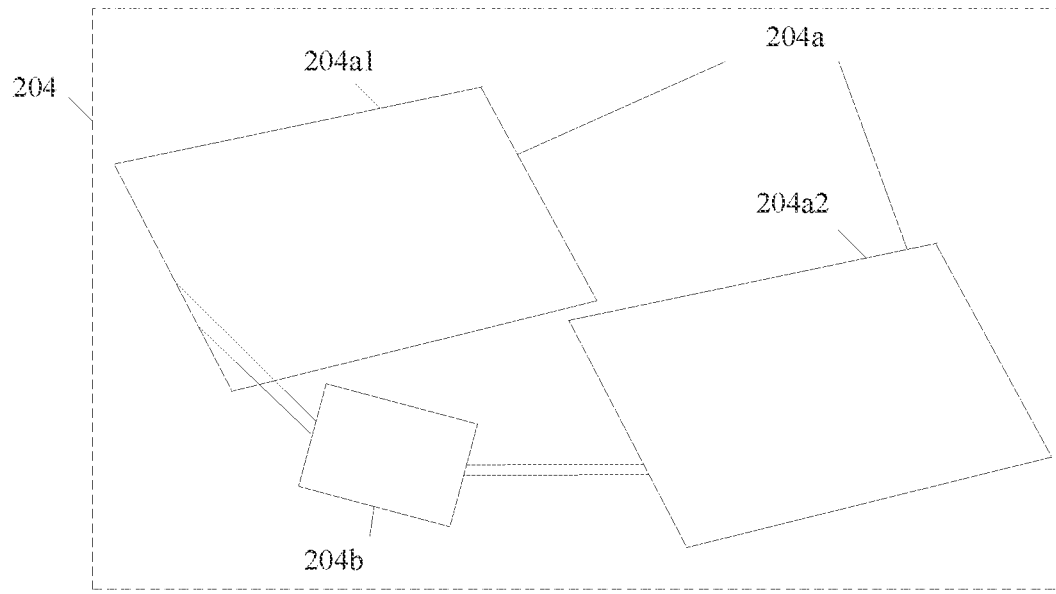
FIG. 2B is a schematic diagram of a structure of another touch sensor according to an embodiment of this application.

FIG. 2B is a schematic diagram of a structure of a touch sensor according to an embodiment of this application. As shown in FIG. 2B, a touch sensor 204 includes a capacitive sensing key 204a (for example, 204a1 and 204a2) and a capacitive detector 204b. The capacitive detector 204b may be connected to the capacitive sensing key. Optionally, the capacitive sensing key 204a includes two copper sheets (for example, a first copper sheet 204a1 and a second copper sheet 204a2). The first copper sheet 204a1 is grounded, and the second copper sheet 204a2 is laid on the inner side of the housing of the robot 202. The capacitive sensing key 204a (for example, 204a1 and 204a2) is configured to sense an operation acting on the robot, and the capacitive detector 204b is configured to detect a capacitance change of the capacitive sensing key 204a.

It should be noted that due to existence of an electric field of a human body, a capacitive sensing key (for example, the second copper sheet 204a2) of a touch point and a touch region in a touch sensor may form a tiny coupling capacitor. In addition, a high-frequency current may easily pass through the small capacitor, but is shunted by the small capacitor. In this way, the touch sensor may obtain a location of the touch point in the touch sensor based on an amount of current flowing into four electrodes that are symmetrical to the second copper sheet 204a2 and distances between the touch point and four corners of the second copper sheet 204a2. For example, the location of the touch point may be represented by two-dimensional coordinates of the touch point in a coordinate system of the copper sheet. For example, an origin of the coordinate system of the copper sheet may be any corner (for example, an upper left corner and a lower left corner) of the copper sheet, and an x axis and a y axis are two sides adjacent to the point. The location of the touch point may be represented as (a1, a2).

It may be understood that a material of the copper sheet is soft, and the housing of the robot is curved. Therefore, the touch sensor 204 can be well attached to the inner side of the housing of the robot. In this way, touch sensitivity of the robot can be increased, and a degree of anthropomorphism of the robot can be improved.

It should be noted that the capacitive sensing key 204a (for example, 204a1 and 204a2) may alternatively be formed by another thin sheet made of a soft metal material, for example, an iron sheet or an aluminum sheet. Optionally, to reduce costs, the capacitive sensing key 204a generally includes the copper sheet.

The IMU may include one or more acceleration sensors and/or gyro sensors. Optionally, the IMU may include three acceleration sensors and three gyro sensors. The three acceleration sensors and the three gyro sensors may form a 6-axis IMU. Alternatively, the IMU may include three acceleration sensors, three gyro sensors, and three magnetometers. The three acceleration sensors, the three gyro sensors, and the three magnetometers may form a 9-axis IMU. The IMU may collect a heading angle of the robot. The heading angle includes an azimuth, a pitch angle, and a roll angle. The following describes the heading angle of the robot with reference to FIG. 2C and FIG. 2D in this embodiment of this application.

Figure 2C:
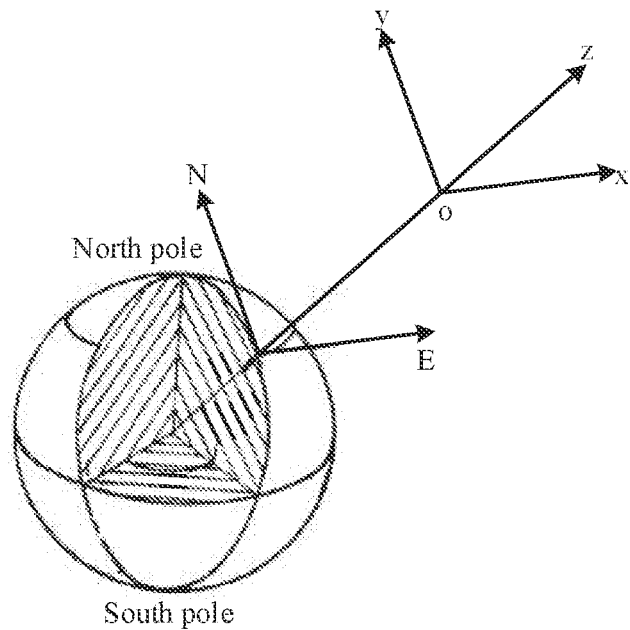
FIG. 2C is a schematic diagram of an example of a geographic coordinate system according to an embodiment of this application.

The IMU collects the heading angle of the robot based on a geographic coordinate system. As shown in FIG. 2C, an origin O of the geographic coordinate system is located on a carrier (that is, a device including the IMU, for example, a point at which the robot is located). An x axis points to east (E) along a local latitude line. A y axis points to north (N) along a local meridian line. A z axis points to up along a local geographic vertical line, and forms a right-hand rectangular coordinate system with the x axis and the y axis. A plane formed by the x axis and the y axis is a local horizontal plane, and a plane formed by the y axis and the z axis is a local meridian plane. Therefore, it may be understood that the coordinate system of the IMU is: using the IMU as the origin O, pointing to east along the local latitude line as the x axis, pointing to north along the local meridian line as the y axis, and pointing to up along the local geographic vertical line (that is, a reverse direction of the geographic vertical line) as the z axis.

Figure 2D:
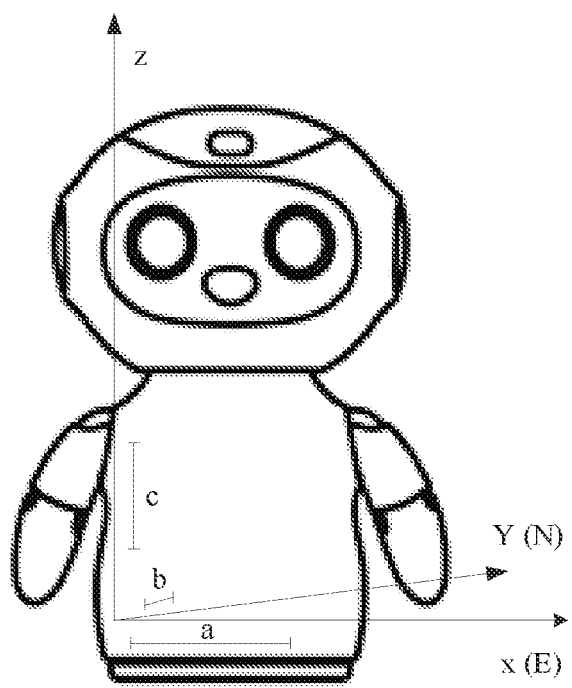
FIG. 2D is a schematic diagram of a state of a robot according to an embodiment of this application.

For example, it is assumed that the robot is in a state shown in FIG. 2D on ground parallel to the horizontal plane. As shown in FIG. 2D, a side a of the robot (that is, any side that is in a front view of the robot and that is parallel to the ground) is parallel to the x axis of the geographic coordinate system, a side b of the robot (that is, any side that is in a side view of the robot and that is parallel to the ground) is parallel to the y axis of the geographic coordinate system, and a side c of the robot (that is, any side that is in a side view of the robot and that is perpendicular to the ground) is parallel to the z axis of the geographic coordinate system.

Figure 2E:
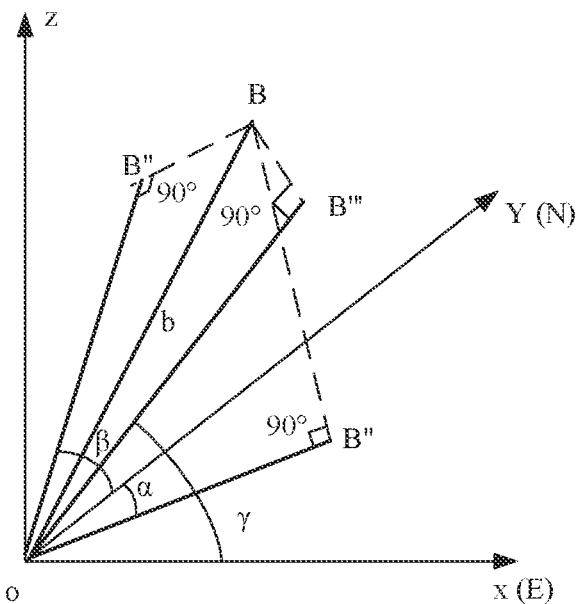
FIG. 2E is a schematic diagram of a heading angle of a robot according to an embodiment of this application.

The azimuth of the robot is: an angle between a projection of the side a of the robot on the xoy plane and the y axis of the geographic coordinate system. For example, the azimuth of the robot is $\alpha$ shown in FIG. 2E. OB is parallel to the side a of the robot, OB' is a projection of oB on the xoy plane, BB' is perpendicular to OB', and $\alpha$ is an angle between OB' and the y axis.

The pitch angle of the robot is: an angle between a projection of the side a of the robot on the yoz plane and the y axis of the geographic coordinate system. For example, the pitch angle of the robot is $\beta$ shown in FIG. 2E. OB is parallel to the side a of the robot, OB" is a projection of OB on the yoz plane, BB" is perpendicular to OB", and $\beta$ is an angle between oB" and the y axis The roll angle of the robot is: an angle between a projection of the side a of the robot on the xoz plane and the x axis of the geographic coordinate system For example, the pitch angle of the robot is $\gamma$ shown in FIG. 2E. OB is parallel to the side a of the robot, OB'" is a projection of OB on the xoz plane, BB'" is perpendicular to OB'", and $\gamma$ is an angle between oB'" and the y axis.

The heading angle of the robot may be represented in a manner of ($\alpha$, $\beta$, $\gamma$). $\alpha$ is the azimuth of the robot, $\beta$ is the pitch angle of the robot, and $\lambda$ is the roll angle of the robot.

The camera may capture an image or a video. For example, the camera may capture a face image of a surrounding user. For another example, the camera may further collect ambient environment information. For another example, the camera may calculate a distance between the user and the camera, that is, the camera may calculate a distance between the user and the robot. In some embodiments, the robot may include one or N cameras, where N is a positive integer greater than 1.

The robot implements a display function through the GPU, the display, the processor, and the like. The GPU is a microprocessor for image processing and is connected to the display and the processor. The GPU is configured to perform mathematical and geometric computation, and render an image. The processor may include one or more GPUs that execute program instructions to generate or change display information.

The display is configured to display an image, a video, and the like. The display includes a display panel. For example, when the robot is a service robot, the display may be configured to display a menu interface, a help interface, and the like. For another example, when the robot is a navigation robot, the display may be configured to display a navigation route interface.

The robot may implement an audio function through the receiver, the microphone, the speaker, the processor, and the like. For example, the robot may collect a voice of a user through the receiver, and talk with the user through the speaker. In addition, the robot may further implement a control function through the receiver, the microphone, the processor, and the like. For example, the robot may collect a voice instruction of a user through receiver, and the processor determines an operation instruction, so that the robot executes a control event.

The robot includes limbs formed by a plurality of steering gears. Each limb of the robot may be made of metal and the like and is driven by a steering gear device, so that the robot can express an action through limbs and execute a control event. For example, to achieve an anthropomorphism effect, the robot may include nine steering gear limbs, so that the robot may perform a common limb action (for example, nodding, shaking, turning, hugging, or greeting). For example, an abdomen of the robot receives a strike operation, and the robot may perform an action of lowering a head to cover a belly.

The processor may include one or more processing units. For example, the processor may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a neural-network processing unit (neural-network processing unit, NPU), and/or the like. Different processing units may be independent components, or may be integrated into one or more processors.

The controller may be a nerve center and a command center of the robot. The controller may generate an operation control signal based on instruction operation code and a time sequence signal, to complete control of instruction fetching and instruction execution.

The memory may be further disposed in the processor, and is configured to store instructions and data. In some embodiments, the memory in the processor is a cache. The memory may store instructions or data just used or cyclically used by the processor. If the processor needs to use the instructions or the data again, the processor may directly invoke the instructions or the data from the memory. This avoids repeated access and reduces waiting time of the processor, thereby improving system efficiency.

In some embodiments, the processor may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a general-purpose input/output (general-purpose input/output, GPIO) interface, a universal serial bus (universal serial bus, USB) interface, and/or the like.

The robot may implement an AI capability through the input component, the output component, the processor, and the like For example, the robot may implement capabilities such as human-computer interaction (Text To Speech, TTS) and voiceprint recognition through the receiver, the speaker, the processor, and the like. For another example, the robot may implement face recognition and face tracking capabilities through the camera, the processor, and the like. Certainly, the robot may also implement capabilities such as ASE, affective computing, and sound source positioning. In this way, the degree of anthropomorphism of the robot can be improved, so that the robot provides more comprehensive functions such as communication, learning, entertainment, and service for a user.

It should be noted that the robot including the input component, the output component, and the processor is merely an example, and the robot may have more or fewer components than the foregoing device, may combine two or more components, or may have different component configurations. The various components may be implemented by hardware including one or more signal processing and/or application-specific integrated circuits, software, or a combination of software and hardware.

Figure 3A:
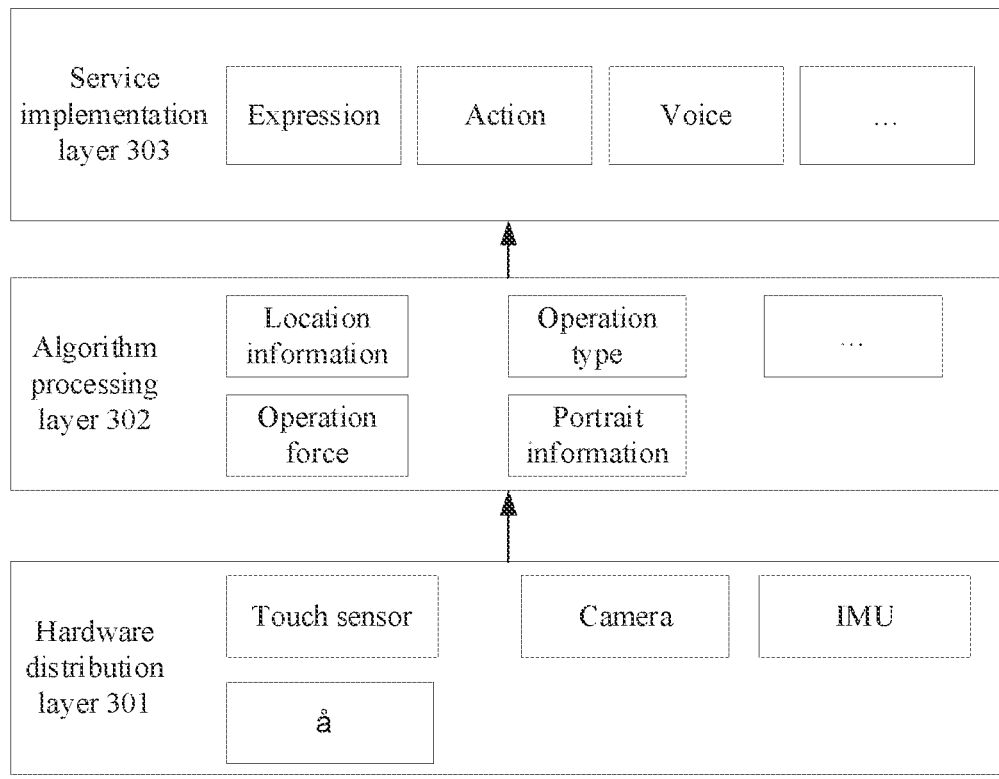
FIG. 3A is a block diagram of a software structure of a robot according to an embodiment of this application.

After the hardware structure of the robot in this embodiment of this application is described, in this application, a system architecture of the robot is described herein by dividing the robot into a plurality of functional modules. As shown in FIG. 3A, the robot includes a hardware distribution layer 301, an algorithm processing layer 302, and a service implementation layer 303.

The hardware distribution layer 301 may collect operation information input by a user. The hardware distribution layer 301 includes the touch sensor, the IMU, the camera, and the like. Specifically, the touch sensor may collect location information where an operation acts on the robot and an operation type of the operation. For example, the touch sensor may collect an operation of pressing for 2 s input by the user on a hand of the robot. The IMU may collect a heading angle of the robot. The camera can capture a face image of a surrounding user and calculate a face distance between the user and the robot. In addition, the hardware distribution layer 301 may further transmit the collected operation information to the algorithm processing layer 302, and the algorithm processing layer 302 determines a touch event based on the operation information.

The algorithm processing layer 302 may receive the operation information from the hardware distribution layer 301. For example, the algorithm processing layer 302 may receive the operation type and the location information of a region of the operation from the touch sensor. For another example, the algorithm processing layer 302 may further receive the heading angle from the IMU. For another example, the algorithm processing layer 302 may further receive portrait information (the face image and the face distance) from the camera. The algorithm processing layer 302 may further detect, based on the heading angle of the robot, whether the robot vibrates, and determine a force of the operation received by the robot. For example, when the robot receives the operation of pressing for 2 s input by the user on the hand of the robot, the heading angle of the robot does not change, and the robot may determine that a force of the pressing operation acting on the robot is small. For another example, when the robot receives a continuous knock operation by the user on a head of the robot, the heading angle of the robot changes, and the robot may determine that a force of the continuous knock operation acting on the robot is large.

Figure 3B:
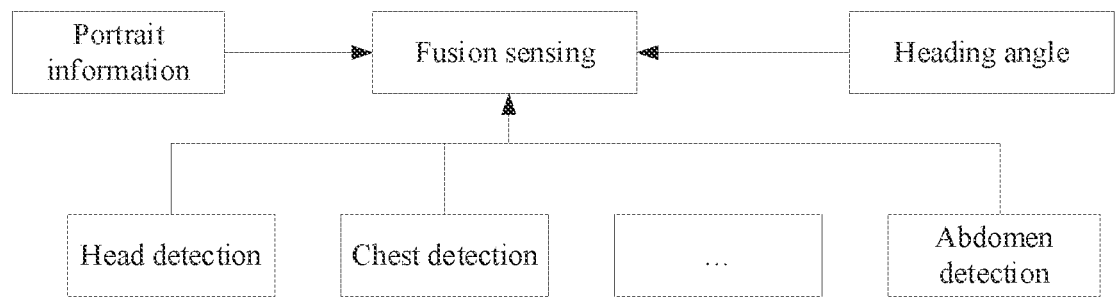
FIG. 3B is a schematic diagram of an example of a robot sensing method according to an embodiment of this application.

In addition, the algorithm processing layer 302 may further determine the touch event based on the operation information. As shown in FIG. 3B, the algorithm processing layer 302 may perform fusion sensing based on an operation type and location information of an operation region that are detected by a touch sensor on each part of the robot, the portrait information, and the heading angle of the robot, to determine the touch event. For example, the algorithm processing layer 302 may receive information that the user knocks the robot on the head, a heading angle when the robot receives the knock operation, and a face distance of 0.5 m, and the algorithm processing layer 302 may determine, with reference to the foregoing operation information, that the touch event is a man-made knock event. In addition, the algorithm processing layer 302 may determine, based on the touch event, a control event executed by the robot, and send the control event to the service implementation layer 303.

The service implementation layer 303 may receive the control event from the algorithm processing layer 302, and control the robot to execute the control event. The robot may execute the control event through an action, an expression, a sound, or the like. For example, when the control event is a handshake event, the robot may perform a handshake action. For another example, when the control event is a happy event, the robot may smile. For another example, when the control event is a laugh event, the robot may make a "hahaha" sound.

Methods in the following embodiments may all be implemented in the robot having the hardware structure and the system architecture An embodiment of this application provides a robot feedback method. The method is applied to a robot. An inner side of a housing of the robot includes a plurality of preset regions (for example, first preset regions) provided with touch sensors.

Specifically, the inner side of the housing of the robot includes a plurality of first preset regions, and each first preset region is provided with a touch sensor. A quantity of first preset regions is not limited in this embodiment of this application. For example, the inner side of the housing of the robot may include 10 first preset regions. For another example, the inner side of the housing of the robot may include 20 first preset regions.

In some embodiments, the first preset region may be distributed on the inner side of the housing on any part of the robot. For example, as shown in FIG. 4, the inner side of the housing of the robot includes 28 first preset regions, and the 28 first preset regions are distributed on the inner side of the housing on a head of the robot, the inner side of the housing on a cheek (a lower left cheek and a lower right cheek), the inner side of the housing on an abdomen, the inner side of the housing on a waist (a lower right waist and a lower left waist), the inner side of the housing on a hand back (a right hand back and a left hand back), the inner side of the housing on a palm (a right palm and a left palm), the inner side of the housing on a shoulder (a left shoulder and a right shoulder), the inner side of the housing on an ear (a left ear and a right ear), the inner side of the housing on a forehead (a left forehead and a right forehead), and the like That is, the touch sensors may be disposed in the 28 first preset regions.

Figure 4:
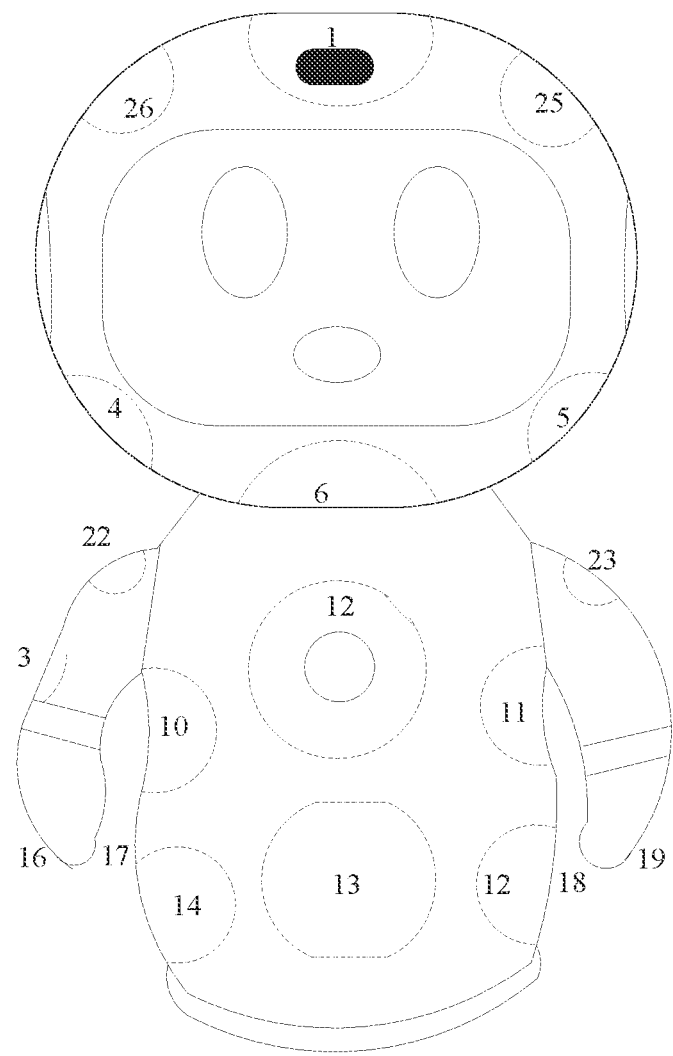
FIG. 4 is a schematic diagram of an example of a robot according to an embodiment of this application.

It should be understood that only the first preset regions in a front view of the robot are shown in FIG. 4. However, the 28 first preset regions included in FIG. 4 may further include any first preset region in a left view, a right view, a top view, and a rear view of the robot that is not shown in FIG. 4, for example, a first preset region on the inner side of the housing on a back in the rear view of the robot It may be understood that a large quantity of touch sensors are disposed on the robot shown in FIG. 4. The robot can receive an operation acting on any region, to ensure that the robot can provide feedback to the operation received in any region, thereby improving the degree of anthropomorphism of the robot.

In some other embodiments, the region in which the touch sensor is disposed may be a region corresponding to a region that is on a surface of the housing of the robot and in which a user operation frequency is high.

In this embodiment of this application, the region that is on the surface of the housing of the robot and in which the user operation frequency is high may be referred to as a second preset region. The surface of the housing of the robot may include a plurality of second preset regions, and the second preset region is a region in which a user operation frequency is greater than a preset frequency threshold. To be specific, the second preset region is a region that is on the surface of the housing of the robot and that is frequently touched by a user.

The plurality of first preset regions on the inner side of the housing of the robot are in a one-to-one correspondence with the plurality of second preset regions on the surface of the housing of the robot. To be specific, the first preset region may be distributed on the inner side of the housing on each part of the robot with a high user operation frequency, and the touch sensor may be disposed on the inner side of the housing on each part of the robot with the high user operation frequency.

For example, before large-scale production of robots, a plurality of users may be randomly selected to interact with the robot, and a region (that is, the second preset region) that is frequently touched in a plurality of regions (for example, a plurality of third preset region) included on the surface of the housing of the robot is recorded. The surface of the housing of the robot includes a plurality of third preset regions (for example, regions on the surface of the housing corresponding to the 28 first preset regions shown in FIG. 4), and the plurality of third preset regions may completely or almost cover the surface of the housing of the robot (for example, a sum of areas of the plurality of third preset regions accounts for 90% of an area of the surface of the housing). For example, with reference to FIG. 4, Table 1 shows a quantity of times that each third preset region receives an operation type when 20 users interact with the robot.

TABLE 1

| | | Slap/time | Continuous slap/time | ... | Touch and hold/time | Total |
|---|---|---|---|---|---|---|
| 1 | (head) | 0 | 1 | | 2 | 2 | 5 |
| 2 | | | | | | 0 |
| 3 | | | | | 1 | 1 |
| 4 | (lower right check) | | 1 | 1 | 1 | 3 |
| 5 | (lower left check) | 1 | | | 2 | 3 |
| ... | | | | | | ... |
| 10 | (left underarm) | | | 6 | 4 | 10 |
| 11 | (right underarm) | | | 6 | 4 | 10 |
| 12 | (chest) | | | 3 | 4 | 7 |
| 13 | (abdomen) | 1 | | 7 | 4 | 12 |
| 14 | (lower right waist) | | | 2 | 1 | 3 |
| 15 | (lower left waist) | | | 5 | 2 | 7 |
| 16 | (right hand back) | | | 4 | 4 | 8 |
| 17 | (right palm) | | | 1 | 1 | 2 |
| 18 | (left palm) | | | 5 | 0 | 5 |
| 19 | (left hand back) | | | 13 | 3 | 16 |
| 20 | | | | | | 0 |
| 21 | | | | | | 0 |
| 22 | (right shoulder) | | 1 | 1 | | 2 |
| 23 | (left shoulder) | | 1 | 2 | 1 | 4 |
| 24 | (right ear) | | | 2 | 2 | 4 |
| 25 | (left ear) | 1 | | 1 | | 2 |
| 26 | (right forehead) | | | 3 | 2 | 5 |
| 27 | (left forehead) | | | 4 | 3 | 7 |
| 28 | (back) | | 1 | 1 | 1 | 3 |
| | Total | 3 | 5 | 69 | 50 | |

With reference to Table 1, it can be learned that the third preset regions on the surface of the housing of the robot, for example, the head, the lower left cheek, the lower right cheek, the chest, the abdomen, the lower left underarm, the lower right underarm, the right palm, the left palm, the right hand back, and the left hand back, are regions in which a user operation frequency is high. To be specific, regions on the surface of the housing on parts such as the head, the lower left cheek, the lower right cheek, the chest, and the abdomen of the robot are the second preset regions. In this way, regions on the inner side of the housing on parts such as the head, the lower left cheek, the lower right cheek, the chest, and the abdomen of the robot are the first preset regions, and the touch sensors may be disposed on the first preset regions on the inner side of the housing on these parts.

It should be noted that in this embodiment of this application, users with different identities may be selected based on a type or a use of the robot to interact with the robot. For example, if the robot is an ordering robot, the randomly selected user may be a dining person. For another example, if the robot is an entertainment robot, the randomly selected user may be a child. The identity of the user is not limited in this embodiment of this application.

Optionally, a region (that is, the second preset region) in which the user frequently performs an operation is recorded, and the touch sensor is disposed only in the first preset region corresponding to the second preset region, so that a quantity of touch sensors disposed in the robot can be reduced. In this way, costs can be reduced while interaction experience between a user and the robot can be ensured.

In addition, at least one IMU is further mounted in the robot, and the IMU may collect a heading angle of the robot. The IMU may be mounted at a center of gravity location of the robot, and the center of gravity location of the robot may be a head and/or a chest of the robot. Generally, when the robot vibrates, the center of gravity of the robot definitely vibrates with the vibration of the robot. Therefore, when a force of an operation received by the robot is excessively large, the center of gravity of the robot vibrates. In this way, the robot may obtain a variation of a heading angle of the center of gravity of the robot through the IMU, that is, a variation of the heading angle of the robot.

In some embodiments, after the robot receives an operation (for example, a first operation) acting on any region (for example, a first region) of the plurality of first preset regions of the robot, the robot may obtain location information of the first region and an operation type of the first operation through the touch sensor. In addition, based on a principle in which the IMU collects the heading angle of the robot described in the foregoing embodiments, the robot may obtain, through the IMU, a heading angle (for example, a first initial heading angle) of the robot before the robot receives the first operation, obtain, through the IMU, a heading angle (for example, a first heading angle) of the robot after the robot receives the first operation, and calculate a difference between the first heading angle and the first initial heading angle to obtain a first offset. The first offset reflects a force of the first operation acting on the robot. Then, in response to the first operation, the robot may execute a control event (for example, a first control event) corresponding to the location information of the first region, the operation type of the first operation, and the force of the first operation acting on the robot.

For example, the first operation received by the robot is a knock operation, and the knock operation acts on a head region of the robot. In addition, the knock operation causes the heading angle of the robot to change, that is, a force of the knock operation is large, and the robot vibrates. In response to the knock operation, the robot may cover the head region with a hand and make a sound of "It hurts!".

For another example, the first operation received by the robot is a knock operation, and the knock operation acts on a head region of the robot. In addition, the knock operation does not cause the heading angle of the robot to change, that is, a force of the knock operation is small, and the robot does not vibrate. In response to the knock operation, the robot may perform a questioning event. For example, the robot makes a sound of "Hello, can I help you?".

It may be understood that in this embodiment of this application, after receiving the first operation acting on the robot, the robot may obtain the location information of the first region, the operation type of the first operation, and the offset (that is, the first offset) of the heading angle after the robot receives the first operation. The first offset may reflect the force of the first operation acting on the robot. In this way, the robot may execute a corresponding control event based on the location information of the first region, the operation type of the first operation, and the operation force of the first operation. Therefore, in this embodiment of this application, the robot can accurately execute a corresponding control event with reference to a plurality of external factors (a region of an operation, an operation type of the operation, and a force of the operation), to improve a degree of anthropomorphism of the robot.

Figure 5:
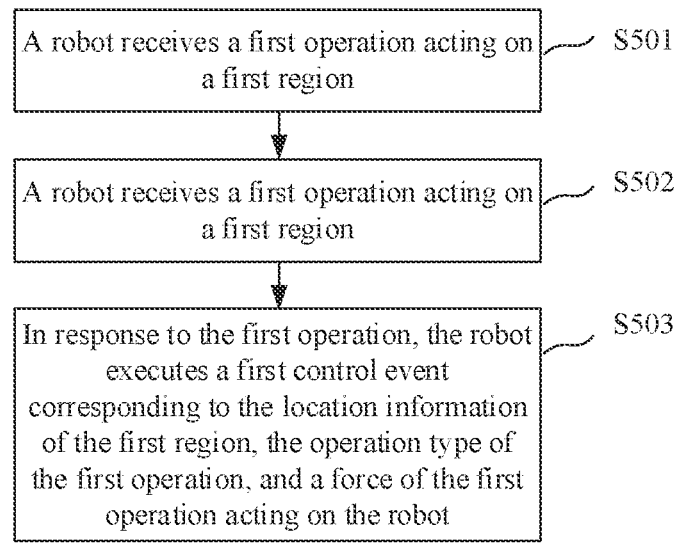
FIG. 5 is a flowchart of a robot feedback method according to an embodiment of this application.

An embodiment of this application provides a robot feedback method. As shown in FIG. 5, the robot feedback method may include S501 to S503.

S501. A robot receives a first operation acting on a first region.

The first region is any region of a plurality of first preset regions. For example, the first region may be a region on an inner side of a housing on a head of the robot. For another example, the first region may be a region on an inner side of a housing on an abdomen of the robot. The first operation may be a touch and hold operation, a touch operation, a knock operation, or the like.

In this embodiment of this application, the first operation may be classified into different operation types based on a touch parameter of the first operation. The touch parameter includes touch duration, a touch displacement distance, and a touch frequency. The touch duration is a time for which the first operation acts on the first region. For example, the touch duration may be 0.3 s, 11 s, 2 s, or the like. The touch displacement distance is a sliding distance of the first operation in the first region. For example, the touch displacement distance is 0.5 cm, 2 cm, 5 cm, or the like. The touch frequency is a quantity of times that the first operation touches the first region in a unit time. For example, the touch frequency may be knocking the robot once or twice within 1 s, or knocking the robot three times within 2 s.

In a possible design, if the touch duration of the first operation is short, and the touch frequency is low, the first operation may be a one-time knock (or slap) operation or the like. For example, the first operation is a slap operation, duration for which the slap operation touches the first region is 0.2 s, and a quantity of times of touching the first region in a unit time (for example, within 2 s) is 1.

If the touch duration of the first operation is short, and the touch frequency is high, the first operation may be a continuous knock (or slap) operation or the like. For example, the first operation is a slap operation, duration for which the slap operation touches the first region is 0.2 s, and a quantity of times of touching the first region in a unit time (for example, within 2 s) is 3.

If the touch duration of the first operation is long, the first operation may be a touch and hold operation or the like. For example, the first operation is a touch and hold operation, and duration for which the touch and hold operation touches the first region is 2.5 s.

If the displacement distance of the first operation is long, the first operation may be a touch operation. For example, the first operation is a touch operation, and a sliding distance of the touch operation in the first region is 3 cm.

S502: The robot obtains location information of the first region, an operation type of the first operation, and a first offset.

The first offset indicates a variation of a heading angle of the robot after the robot receives the first operation, and the first offset can reflect a force of the first operation acting on the robot.

In this embodiment of this application, the robot may obtain a first heading angle and a first initial heading angle, where the first heading angle is a heading angle of the robot after the robot receives the first operation, and the first initial heading angle is a heading angle of the robot before the robot receives the first operation. Then, the robot may calculate a difference between the first heading angle and the first initial heading angle to obtain the first offset.

For example, a heading angle (that is, the first initial heading angle) of the robot before the robot receives the first operation (for example, the knock operation) is A. After the robot receives the knock operation, the robot vibrates, and a heading angle (that is, the first heading angle) of the robot is B. The first offset is B-A.

In a possible design, the robot may classify the first operation into a soft operation and a strong operation based on the first offset. The soft operation is an operation with a small operation force, the strong operation is an operation with a large operation force, and a force corresponding to the strong operation is greater than a force corresponding to the soft operation. Specifically, if the first offset is greater than a preset offset threshold, the first operation is the strong operation. If the first offset is less than the preset offset threshold, the first operation is the soft operation.

It may be understood that the robot may vibrate when the force of the first operation acting on the robot is excessively large. The robot does not vibrate when the force of the first operation acting on the robot is small. When the robot vibrates, the heading angle of the robot changes. Therefore, the force of the first operation acting on the robot can be reflected based on the first offset of the heading angle of the robot.

It should be noted that if the preset offset threshold is 0, it indicates that when the robot slightly vibrates, and the first offset is small, the robot may determine that the first operation is the strong operation. To be specific, when the preset offset threshold is 0, a classification threshold for the strong operation is low. If the preset offset threshold is greater than 0, it indicates that even if the robot slightly vibrates, and the first offset is small (that is, the first offset is greater than 0 and less than the preset offset threshold), the robot determines that the first operation is the soft operation. To be specific, when the preset offset threshold is greater than 0, the classification threshold for the strong operation is high. The preset offset threshold is not limited in this embodiment of this application.

For example, it is assumed that the preset offset threshold is 0. The robot is in a static state when not receiving the first operation, and the robot can collect an initial heading angle as a through the IMU. After the robot receives the first operation, the robot can collect the first heading angle as b through the IMU. If a is different from b (that is, the first initial heading angle is different from the first heading angle), the robot may determine that the first operation is the strong operation. If a is the same as b (that is, the first initial heading angle is equal to the first heading angle), the robot may determine that the first operation is the soft operation.

In another possible design, the robot may classify the first operation into a plurality of levels of operations (for example, a first-level operation and a second-level operation) based on the first offset. A force corresponding to an operation with a higher level is greater than a force corresponding to an operation with a lower level. For example, a force corresponding to a third-level operation is greater than a force corresponding to the second-level operation. For example, the robot may set a plurality of preset offset thresholds (for example, a first preset offset threshold and a second preset offset threshold). If the first offset is less than the first preset offset threshold, the first operation is the first-level operation. If the first offset is less than the second preset offset threshold and greater than the first preset offset threshold, the first operation is the second-level operation.

It may be understood that, by setting the plurality of preset offset thresholds, the force of the first operation acting on the robot may be accurately divided. In this way, the robot can execute different control events based on operations of different forces, to improve a degree of anthropomorphism of the robot.

In this embodiment of this application, the robot may obtain the location information of the first region through the touch sensor disposed in the first region. Specifically, each touch sensor corresponds to one preset identifier, and preset identifiers of the touch sensors are different. For example, a preset identifier of a touch sensor disposed on the inner side of the housing on the head is a number 1, and a preset identifier of a touch sensor disposed on the inner side of the housing on the abdomen is a number 13. In addition, the robot may store a correspondence between a preset identifier of each touch sensor and a region in which each touch sensor is disposed. When the robot obtains a touch parameter (which includes a preset identifier of the touch sensor) from a touch sensor, the robot may obtain the location information of the first region based on the preset identifier of the touch sensor and a correspondence between the preset identifier of the touch sensor and a region in which the touch sensor is disposed.

For example, it is assumed that a preset identifier of the touch sensor disposed in the first region is a number 1, and the number 1 corresponds to a region on the inner side of the housing on the head of the robot. When the robot receives the first operation acting on the first region, the robot may obtain the preset identifier of the touch sensor, which is the number 1, and the robot may determine that a location of the first region is the head of the robot.

In addition, the robot may obtain the operation type of the first operation through the touch sensor disposed in the first region. Specifically, the robot may obtain, through the touch sensor, a touch parameter generated by the first operation in the first region, and determine the operation type of the first operation based on the touch parameter. For example, it is assumed that a touch duration threshold, a touch displacement distance threshold, and a touch interval duration threshold are set in the robot. If touch duration obtained by the robot is greater than the touch duration threshold, the robot determines that the first operation is a touch and hold operation. If a touch displacement distance obtained by the robot is greater than the touch displacement distance threshold, the robot determines that the first operation is a touch operation. If a touch frequency obtained by the robot is greater than the touch frequency threshold, the robot determines that the first operation is a continuous pressing operation.

S503: In response to the first operation, the robot executes a first control event corresponding to the location information of the first region, the operation type of the first operation, and the force of the first operation acting on the robot.

In some embodiments, in response to the first operation, the robot may determine, based on the location information of the first region, the operation type of the first operation, and the force (referred to as an operation force) of the first operation acting on the robot, a first touch event corresponding to the first operation. Then, the robot may execute the first control event corresponding to the first touch event.

It should be noted that the robot may store a correspondence (which may be referred to as a recognition policy) between a touch event and location information of a region on which an operation is performed, an operation type of the operation, and an operation force of the operation. In this way, the robot may determine the touch event based on the recognition policy. In addition, the robot may store a correspondence (which may be referred to as a feedback policy for short) between a touch event and a control event. In this way, the robot may execute the control event based on the feedback policy.

For example, as shown in Table 2. Table 2 shows a correspondence between a control event and location information of a region on which an operation is performed, an operation type of the operation, an operation force of the operation, and a touch event.

TABLE 2

| Location information of an operation region | Operation type | Operation force | Touch event | Control event |
| --- | --- | --- | --- | --- |
| Head | Slap | Large | Being hit | Crying |
| Abdomen | Touch | Small | Friendly communication | Say hello to a user |
| Palm | Touch and hold | Small | Handshake | Handshake |

With reference to Table 2, it can be learned that the robot may recognize different touch events based on location information of different operation regions, operation types, and operation forces, and execute different control events. For example, when the robot receives an operation of touching and holding the palm of the robot by the user, and an operation force is small, the robot may execute a handshake event (for example, raising arms and combining palms).

It should be noted that Table 2 is an example provided in this embodiment of this application. The recognition policy and the feedback policy are not limited in this embodiment of this application.

Based on the foregoing solution, after receiving the first operation acting on the robot, the robot may obtain the location information of the first region, the operation type of the first operation, and the offset (that is, the first offset) of the heading angle after the robot receives the first operation. The first offset may reflect the force of the first operation acting on the robot. In this way, the robot may execute a corresponding control event based on the location information of the first region, the operation type of the first operation, and the operation force of the first operation. Therefore, in this embodiment of this application, the robot can accurately execute a corresponding control event with reference to a plurality of external factors (a region of an operation, an operation type of the operation, and a force of the operation), to improve a degree of anthropomorphism of the robot.

In some embodiments, the control event executed by the robot is related to the location information of the operation region and the operation force, and is irrelevant to the operation type. Specifically, after receiving the first operation acting on the first region, the robot may obtain the location information of the first region and the first offset. In response to the first operation, the robot may execute the control event corresponding to the location information of the first region and the force of the first operation acting on the robot.

For example, if the robot receives an operation acting on the head, and an operation force of the operation is large, the robot may cry and make an "ohh" sound. The operation may be an operation of any type. For example, the operation may be pressing. For another example, the operation may be a knock. For another example, the operation may be a continuous knock.

It may be understood that, in the technical solution, the robot executes a corresponding control event with reference to only the location information of the operation region and the operation force, so that a calculation amount of the robot on data can be reduced, a response speed of the robot can be improved, and the degree of anthropomorphism of the robot is increasingly high.

In some embodiments, the control event executed by the robot is related to the operation type of the operation and the operation force, and is irrelevant to the operation region. Specifically, after receiving the first operation acting on the first region, the robot may obtain the operation type of the first operation and the first offset. In response to the first operation, the robot may execute a control event corresponding to the operation type of the first operation and the force of the first operation acting on the robot.

For example, if the robot receives a touch operation, and an operation force of the operation is small, the robot may make a smile expression. The touch operation may act on any first preset region of the robot. For example, the first preset region may be the head of the robot. For another example, the first preset region may be the back of the robot. For another example, the first preset region may be the abdomen of the robot.

It may be understood that, in the technical solution, the robot executes a corresponding control event with reference to only the operation type and the operation force, so that a calculation amount of the robot on data can be reduced, a response speed of the robot can be improved, and the degree of anthropomorphism of the robot is increasingly high.

It should be noted that the robot may alternatively obtain only any parameter of the location information of the operation region, the operation type, and the operation force, and execute a control event corresponding to the parameter. In this way, a calculation amount of the robot on data can be reduced, a response speed of the robot can be improved, and the degree of anthropomorphism of the robot is increasingly high.

In some embodiments, the robot may further include a camera and the camera may collect portrait information. The robot may determine, based on the portrait information, whether the first touch event is a man-made event.

In a possible design, in response to the first operation, the robot may determine that the first touch event is the man-made event if the robot collects the portrait information. In response to the first operation, the robot may determine that the first touch event is a non-man-made event if the robot does not collect the portrait information.

For example, in response to a pressing operation acting on the abdomen, the robot may determine that a touch event is a man-made strike event if the robot can collect the portrait information and the first offset is greater than the preset offset threshold. For another example, in response to the pressing operation acting on the abdomen, the robot may determine that the touch event is an accidental impact event if the robot does not collect the portrait information and the first offset is greater than the preset offset threshold, for example, an event in which the robot falls down or the robot collides with an object.

In another possible design, in response to the first operation, when the robot can collect the portrait information, the robot may determine whether the first operation is a man-made event based on a distance between the user and the robot. Specifically, the portrait information includes a face image and a portrait distance, where the portrait distance is a distance between the user and the robot. In response to the first operation, the robot may determine that the first touch event is the man-made event if the robot can collect the portrait information and the portrait distance is less than a preset distance threshold. In response to the first operation, the robot may determine that the first touch event is the non-man-made event if the robot can collect the portrait information and the portrait distance is greater than the preset distance threshold.

For example, it is assumed that the preset distance threshold is 1 m. The robot may collect a face image in response to the knock operation. If the portrait distance is 0.5 m, the robot may determine that the knock operation is a man-made knock operation. If the portrait distance is 3 m, the robot may determine that the knock operation is an accidental hit event. For example, the robot is smashed by an object (like a stone) or the robot collides with an object.

It may be understood that the robot determines, by using the portrait information (the face image and the portrait distance), whether the first operation is the man-made event, so that a touch event recognized by the robot can be increased. In this way, the robot can feed back more control events, to improve the degree of anthropomorphism of the robot.

Figure 6A:
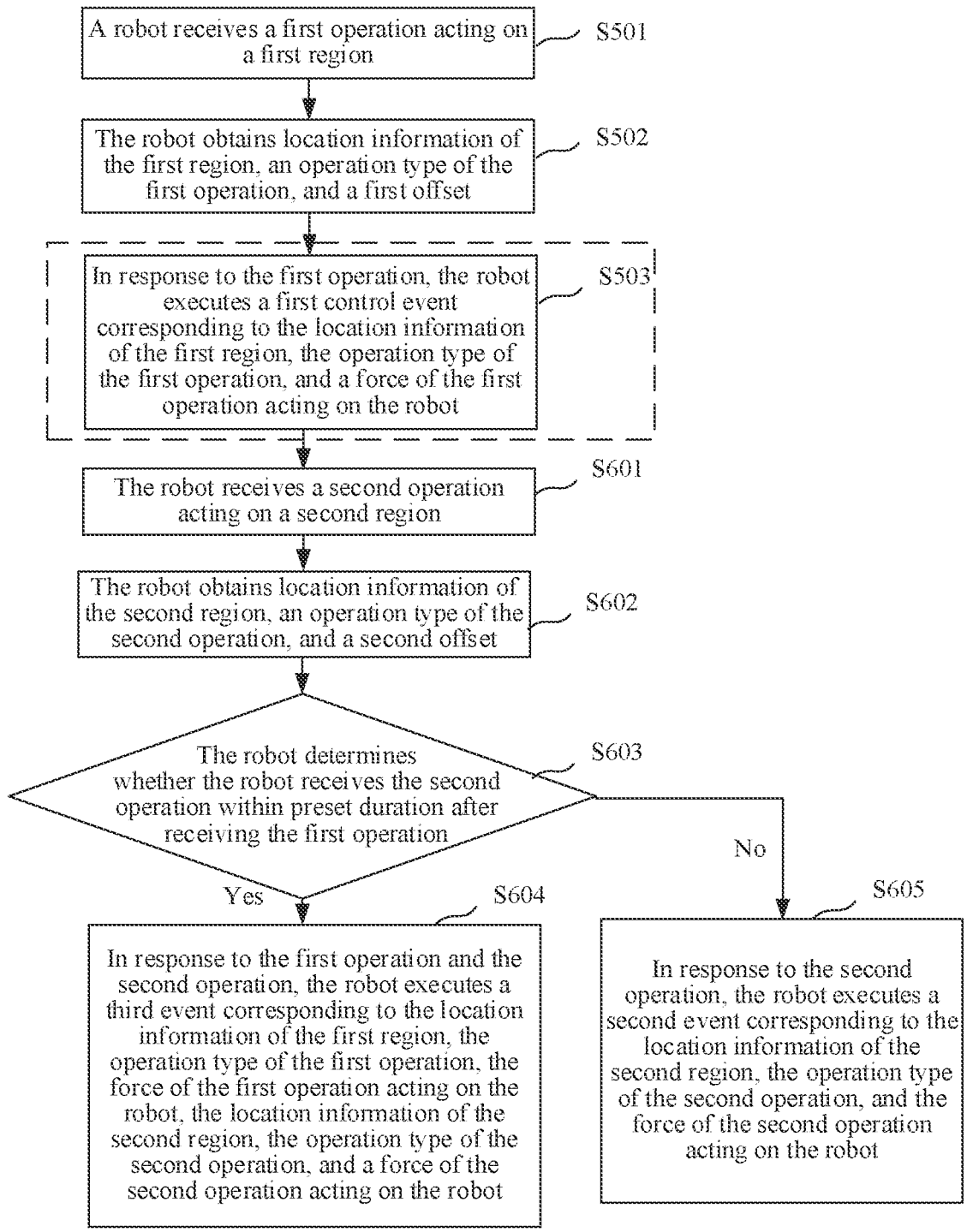
FIG. 6A is a flowchart of another robot feedback method according to an embodiment of this application.

In some embodiments, after receiving the first operation, the robot may further receive a second operation. The robot may execute a corresponding control event depending on whether the robot receives the second operation within preset duration after receiving the first operation. For example, as shown in FIG. 6A, the method further includes the following steps.

S601: A robot receives a second operation acting on a second region.

The second region is any region of the plurality of first preset regions.

In this embodiment of this application, whether the first region and the second region are the same is not limited. To be specific, the first region and the second region may be a same region, or the first region and the second region may be different regions. For example, both the first operation and the second operation may act on the head of the robot. For another example, the first operation may act on the right underarm of the robot, and the second operation may act on the left underarm of the robot.

In this embodiment of this application, whether the first operation and the second operation are the same is not limited. To be specific, the first operation and the second operation may be a same operation, or the first operation and the second operation may be different operations.

It should be noted that for a detailed description that the robot receives the second operation acting on the second region, refer to the description that the robot receives the first operation acting on the first region in S501. Details are not described herein again.

S602: The robot obtains location information of the second region, an operation type of the second operation, and a second offset.

The second offset is a difference between a second heading angle of the robot and a second initial heading angle of the robot, the second heading angle is a heading angle of the robot after the robot receives the second operation, the second initial heading angle is a heading angle of the robot before the robot receives the second operation, and the second offset reflects a force of the second operation acting on the robot.

It should be noted that for a detailed description that the robot obtains the location information of the second region, the operation type of the second operation, and the second offset, refer to the description in S502. Details are not described herein again.

S603. The robot determines whether the robot receives the second operation within preset duration after receiving the first operation.

Figure 6B:
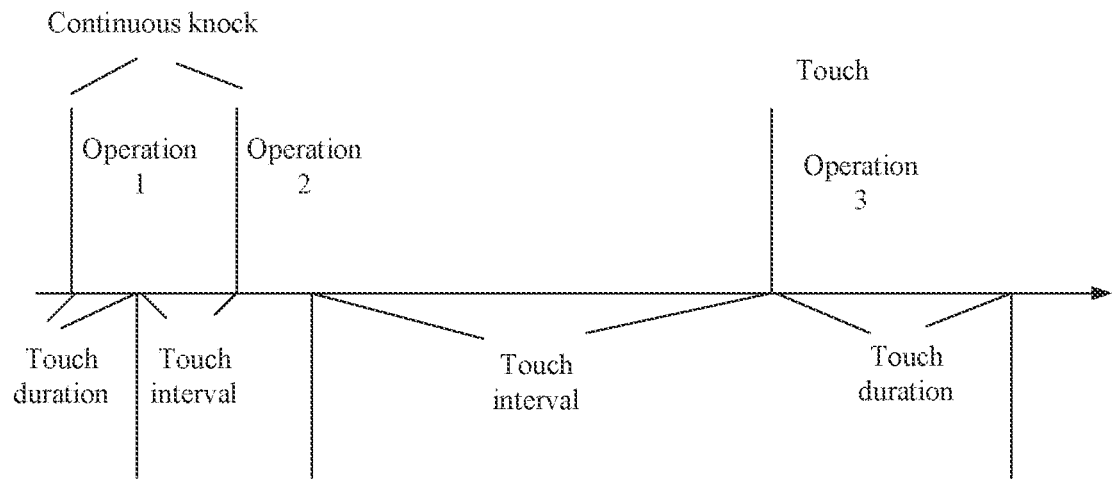
FIG. 6B is a schematic diagram of detecting a touch event by a robot according to an embodiment of this application.

In this embodiment of this application, if the second operation is an operation received by the robot within the preset duration after receiving the first operation, the first operation and the second operation may correspond to one touch event. To be specific, the robot receives the second operation within the preset duration after receiving the first operation, and the robot executes one control event corresponding to the first operation and the second operation, but does not execute the first control event corresponding to the first operation and a second control event corresponding to the second operation. For example, as shown in FIG. 6B, if a touch interval between an operation 1 and an operation 2 is less than preset duration, the operation 1 and the operation 2 may correspond to one touch event (for example, a continuous knock).

If the second operation is an operation received by the robot after the preset duration after receiving the first operation, the first operation and the second operation may correspond to two control events. To be specific, if the robot receives the second operation within the preset duration after receiving the first operation, the robot executes only a control event corresponding to the second operation. For example, as shown in FIG. 6B, if a touch interval between the operation 2 and an operation 3 is greater than the preset duration, the operation 2 may correspond to a touch event (for example, a slap), and the operation 2 may correspond to a touch event (for example, a touch).

It should be noted that setting of the preset duration is not limited in this embodiment of this application. For example, the preset duration may be positively correlated with touch duration of the first operation. To be specific, longer duration of the first operation indicates longer preset duration. For example, when the first operation is pressing, and the touch duration of the pressing is 0.8 s, the preset duration may be 1.5 s. For another example, when the first operation is a touch and hold, and the touch duration of the touch and hold is 2 s, the preset duration is 3 s.

In a possible design, if the robot receives, within the preset duration after the robot receives the first operation, the second operation acting on the second region, the robot may perform S604. If the robot receives, after the preset duration after the robot receives the first operation, the second operation acting on the second region, the robot may perform S605.

It should be noted that if the robot receives, within the preset duration after the robot receives the first operation, the second operation acting on the second region, the robot does not perform S503. If the robot receives, after the preset duration after the robot receives the first operation, the second operation acting on the second region, the robot may perform S503 after S502.

S604: In response to the first operation and the second operation, the robot executes a third control event corresponding to the location information of the first region, the operation type of the first operation, the force of the first operation acting on the robot, the location information of the second region, the operation type of the second operation, and the force of the second operation acting on the robot.

For example, it is assumed that the preset duration is 3 s. An interval between receiving the first operation and receiving the second operation by the robot is 1 s. The first operation is pressing the right underarm of the robot, and the robot can collect the portrait information and the first offset. The second operation is pressing the left underarm of the robot, and the robot can collect the portrait information and the second offset The robot may recognize a touch event formed by the first operation and the second operation as a hug event. Then, the robot may execute a hug control event corresponding to the hug event. For example, the robot may raise two arms to hug the user.

It may be understood that in response to the first operation and the second operation, the robot may perform a control event (that is, the third control event). In this way, the robot can feed back a control event for a combination of a plurality of operations, to improve the degree of anthropomorphism of the robot.

S605: In response to the second operation, the robot may execute a second control event corresponding to the location information of the second region, the operation type of the second operation, and the force of the second operation acting on the robot.

For example, it is assumed that the preset duration is 3 s. An interval between receiving the first operation and receiving the second operation by the robot is 3.5 s. For example, if the second operation is pressing the left underarm of the robot, and the robot can collect portrait information through the camera, the robot may recognize the second operation as a scratch event, and the robot may make a sound of "hahaha, it's itching".

It may be understood that, when an interval between the first operation and the second operation is greater than the preset duration, the robot may divide the first operation and the second operation into two touch events, and execute different control events In this way, the robot can execute more control events, to improve the degree of anthropomorphism of the robot.

Based on the foregoing solution, the robot may execute a corresponding control event depending on whether the robot receives the second operation within the preset duration after receiving the first operation. In this way, the robot can execute more control events based on different operations, to improve the degree of anthropomorphism of the robot.

Figure 7:
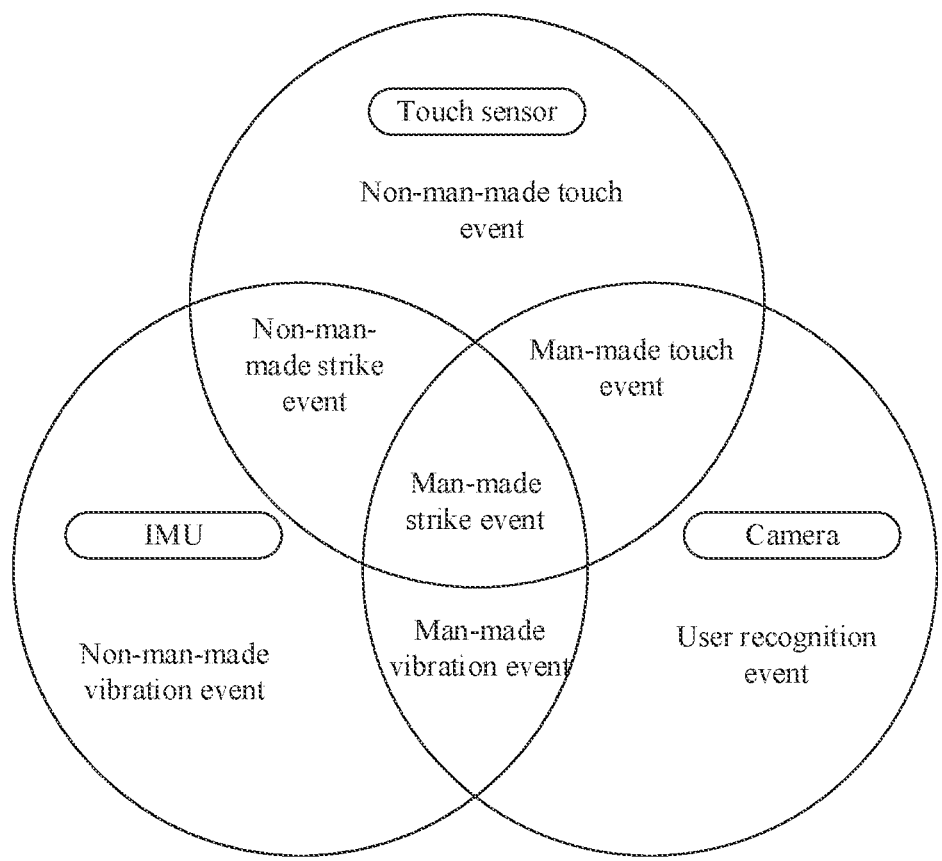
FIG. 7 is a schematic diagram of an example of detecting an event by a robot according to an embodiment of this application.

In some other embodiments, the robot may further recognize a corresponding touch event when not receiving the first operation. For example, as shown in FIG. 7, when the robot does not obtain the touch parameter collected by the touch sensor and the portrait information collected by the camera, but obtains a variation of the heading angle, the robot may detect a non-man-made vibration event (or a falling event). When the robot does not obtain the touch parameter collected by the touch sensor and the variation of the heading angle, but obtains the portrait information, the robot may detect a user recognition event. When the robot does not obtain the touch parameter collected by the touch sensor, but obtains the portrait information and the variation of the heading angle, the robot may detect a man-made vibration event.

Certainly, when the robot obtains the touch parameter collected by the touch sensor, the robot may also recognize the touch event based on the touch parameter and another operation information (for example, the heading angle and the portrait information) For example, as shown in FIG. 7, when the robot obtains the touch parameter collected by the touch sensor, but does not obtain the variation of the heading angle and the portrait information, the robot may detect a non-man-made touch event. When the robot obtains the touch parameter collected by the touch sensor and the variation of the heading angle, but does not obtain the portrait information, the robot may detect a non-man-made strike event. When the robot obtains the touch parameter collected by the touch sensor and the portrait information, but does not obtain the variation of the heading angle, the robot may detect a man-made touch event. When the robot obtains the touch parameter collected by the touch sensor, the variation of the heading angle, and the portrait information, the robot may detect a man-made strike event.

It should be noted that for detailed descriptions of the non-man-made vibration event, the man-made vibration event, the user recognition event, the non-man-made strike event, the man-made strike event, the man-made touch event, and the non-man-made touch event, refer to the descriptions in the foregoing embodiments. Details are not described herein again.

The solution provided in embodiments of this application is mainly described above from the perspective of the robot. It may be understood that, to implement the foregoing functions, the robot includes corresponding hardware structures and/or software modules for performing the functions. A person skilled in the art should be easily aware that this application can be implemented by hardware or in a form of a combination of hardware and computer software with reference to algorithm steps of the robot feedback method of examples described in embodiments disclosed in this application. Whether a function is performed by using hardware or by robot software driving hardware depends on particular applications and design constraint conditions of the technical solutions. A person skilled in the art may use different methods to implement the described functions of each particular application, but it should not be considered that the implementation goes beyond the scope of this application.

In embodiments of this application, functional module division or functional unit division may be performed on the robot based on the foregoing method examples, for example, each functional module or functional unit may be divided corresponding to each function, or two or more functions may be integrated into one processing module. The integrated module may be implemented in a form of hardware, or may be implemented in a form of a software functional module or functional unit. The module or unit division in this embodiment of this application is an example, and is merely a logical function division, and there may be another division manner during actual implementation.

Some other embodiments of this application provide a robot (for example, the robot 202 shown in FIG. 2A). The robot may include: a memory and one or more processors. The memory is coupled to the processor. The robot may further include a camera. Alternatively, the robot may be connected to an external camera. The memory is configured to store computer program code. The computer program code includes computer instructions. When the processor executes the computer instructions, the robot may perform each function or step performed by the robot in the foregoing method embodiments. For a structure of the robot, refer to the structure of the robot 202 shown in FIG. 2A.

Figure 8:
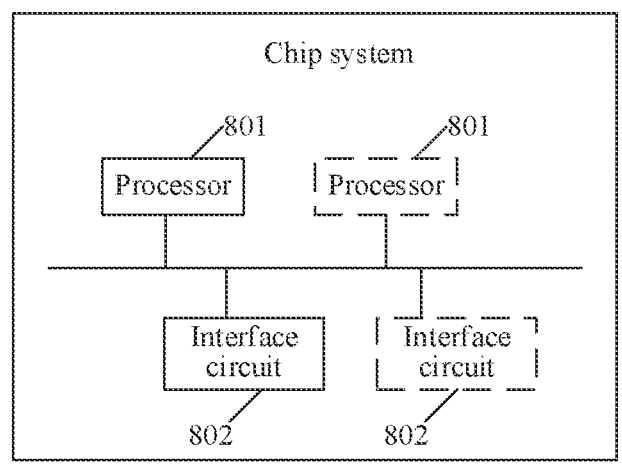
FIG. 8 is a schematic diagram of a structure composition of a chip system according to an embodiment of this application.

An embodiment of this application further provides a chip system. As shown in FIG. 8, the chip system includes at least one processor 801 and at least one interface circuit 802. The processor 801 and the interface circuit 802 may be interconnected through a line. For example, the interface circuit 802 may be configured to receive a signal from another apparatus (for example, a memory of the robot). For another example, the interface circuit 802 may be configured to send a signal to another apparatus (for example, the processor 801). For example, the interface circuit 802 may read instructions stored in the memory and send the instructions to the processor 801. When the instructions are executed by the processor 801, the robot (for example, the robot 202 shown in FIG. 2A) may be enabled to perform the steps in the foregoing embodiments. Certainly, the chip system may further include another discrete device. This is not specifically limited in this embodiment of this application.

An embodiment of this application further provides a computer storage medium. The computer storage medium includes computer instructions. When the computer instruction runs on a robot (the robot 202 shown in FIG. 2A), the robot is enabled to perform the functions or the steps performed by the robot in the foregoing method embodiments.

An embodiment of this application further provides a computer program product. When the computer program product runs on a computer, the computer is enabled to perform the functions or the steps performed by the robot in the foregoing method embodiments.

The foregoing descriptions about implementations allow a person skilled in the art to clearly understand that, for the purpose of convenient and brief description, division of the foregoing functional modules is used as an example for illustration. During actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes: any medium that can store program code such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a robot, wherein the method comprises:
   receiving, using a touch sensor for a plurality of first preset regions on an inner side of a housing of the robot, a first operation acting on a first region from the first preset regions;
   obtaining, using an inertial measurement unit (IMU) mounted in the robot, a first heading angle of the robot;
   obtaining first location information of the first region, a first operation type of the first operation, and a first offset of the first heading angle after receiving the first operation, wherein the first offset reflects a force of the first operation; and
   applying, in response to the first operation, a first control event corresponding to the first location information, the first operation type, and the force.

2. The method according to claim 1, wherein obtaining the first offset comprises:
   obtaining a first initial heading angle before receiving the first operation; and
   calculating a difference between the first heading angle and the first initial heading angle to obtain the first offset.

3. The method according to claim 1, wherein the first operation is designated as a strong operation when the first offset is greater than a preset offset threshold, wherein the first operation is designated as a soft operation when the first offset is less than the preset offset threshold, and wherein a first force corresponding to the strong operation is greater than a second force corresponding to the soft operation.

4. The method according to claim 1, wherein the first preset regions are in a one-to-one correspondence with a plurality of second preset regions on a surface of the housing of the robot, where a user operation frequency is greater than a preset frequency threshold.

5. The method according to claim 1, wherein the method further comprises:
   capturing, using a camera of the robot, an image; and
   determining, in response to the first operation and when collecting portrait information of the image, that the first control event is an artificially triggered control event.

6. The method according to claim 5, wherein the portrait information comprises a face image and a portrait distance, wherein the portrait distance indicates a distance between the robot and a user, and wherein the method further comprises further determining that the first control event is the artificially triggered control event when the portrait distance is less than a preset distance threshold.

7. The method according to claim 6, wherein the method further comprises:
   determining, that the first control event is a non-artificially triggered control event when the portrait distance is greater than the preset distance threshold; or
   determining that the first control event is a non-artificially triggered control event when no portrait information is collected.

8. The method according to claim 1, wherein the method further comprises:
   receiving, when a preset duration time after receiving the first operation has expired, a second operation acting on a second region from the first preset regions;

obtaining a second heading angle of the robot after receiving the second operation;
obtaining a second initial heading angle of the robot before receiving the second operation;
obtaining second location information of the second region, a second operation type of the second operation, and a second offset as a difference between the second heading angle and the second initial heading angle, wherein the second offset reflects a second force of the second operation acting on the robot; and
applying, in response to the second operation, a second control event corresponding to the second location information, the second operation type, and the second force.

9. The method according to claim 1, wherein the method further comprises:
receiving, within a preset duration time after receiving the first operation, a second operation acting on a second region from the first preset regions;
obtaining a second heading angle of the robot after receiving the second operation;
obtaining a second initial heading angle of the robot before receiving the second operation;
obtaining second location information of the second region, a second operation type of the second operation, and a second offset as a difference between the second heading angle and the second initial heading angle, wherein the second offset reflects a second force of the second operation acting on the robot; and
applying, in response to the first operation and the second operation, a second control event corresponding to the first location information, the first operation type, the force, the second location information, the second operation type, and the second force.

10. A robot, wherein the robot comprises:
an inertial measurement unit (IMU) configured to collect a first heading angle of the robot;
a housing comprising an inner side;
a plurality of first preset regions on the inner side;
a touch sensor coupled to the first preset regions and configured to collect a first operation acting on a first region from the first preset regions; and
one or more processors coupled to the IMU and the touch sensor; and configured to enable the robot to:
obtain first location information of the first region, a first operation type of the first operation, and a first offset of the first heading angle after receiving the first operation, wherein the first offset reflects a force of the first operation; and
apply, in response to the first operation, a first control event corresponding to the first location information, the first operation type, and the force.

11. The robot according to claim 10, wherein the one or more processors are further configured to enable the robot to:
obtain a first initial heading angle before receiving the first operation; and
calculate a difference between the first heading angle and the first initial heading angle, to obtain the first offset.

12. The robot according to claim 10, wherein the IMU is mounted on a head of the robot or a chest of the robot.

13. The robot according to claim 10, wherein when the first offset is greater than a preset offset threshold, the first operation is designated as a strong operation, wherein when the first offset is less than the preset offset threshold, the first operation is designated as a soft operation, and wherein a first force corresponding to the strong operation is greater than a second force corresponding to the soft operation.

14. The robot according to claim 10, wherein the first preset regions are in a one-to-one correspondence with a plurality of second preset regions on a surface of the housing of the robot, where a user operation frequency is greater than a preset frequency threshold.

15. The robot according to claim 10, wherein the robot further comprises a camera configured to capture an image, wherein the one or more processors are further configured to enable the robot to determine, in response to the first operation and when collecting portrait information of the image, that the first control event is an artificially triggered control event.

16. The robot according to claim 15, wherein the portrait information comprises a face image and a portrait distance, wherein the portrait distance indicates a distance between the robot and a user, and wherein the one or more processors are further configured to enable the robot to further determine that the first control event is the artificially triggered control event when the portrait information and the portrait distance is less than a preset distance threshold.

17. The robot according to claim 16, wherein the one or more processors are further configured to enable the robot to:
determine that the first control event is a non-artificially triggered control event when the portrait distance is greater than the preset distance threshold; or
determine that the first control event is a non-artificially triggered control event when no portrait information is collected.

18. The robot according to claim 10, wherein the one or more processors are further configured to enable the robot to:
receive, when a preset duration time after receiving the first operation has expired, a second operation acting on a second region from the first preset regions;
obtain a second heading angle of the robot after receiving the second operation;
obtain a second initial heading angle of the robot before receiving the second operation;
obtain second location information of the second region, a second operation type of the second operation, and a second offset as a difference between the second heading angle and the second initial heading angle, wherein the second offset reflects a second force of the second operation acting on the robot; and
apply, in response to the second operation, a second control event corresponding to the second location information, the second operation type, and the second force.

19. The robot according to claim 10, wherein the one or more processors are further configured to enable the robot to:
receive, within a preset duration time after receiving the first operation, a second operation acting on a second region from the first preset regions;
obtain a second heading angle of the robot after receiving the second operation;
obtain a second initial heading angle of the robot before receiving the second operation;
obtain second location information of the second region, a second operation type of the second operation, and a second offset as a difference between the second heading angle and the second initial heading angle, wherein the second offset reflects a second force of the second operation acting on the robot; and apply, in response to the first operation and the second operation, a second control event corresponding to the first location information, the first operation type, the force, the second location information, the second operation type, and the second force.

20. A non-transitory computer storage medium comprising computer instructions that when executed by one or more processors, cause a robot to:
receive a first operation acting on a first region from of a plurality of first preset regions on an inner side of a housing of the robot;
obtain, using an inertial measurement unit (IMU), a first heading angle of the robot;
obtain first location information of the first region, a first operation type of the first operation, and a first offset of the first heading angle after receiving the first operation, wherein the first offset reflects a force of the first operation; and
apply, in response to the first operation, a first control event corresponding to the first location information, the first operation type, and the force.

* * * * *